United States Patent Office 3,809,727
Patented May 7, 1974

3,809,727
DEHYDRATION OF 3-METHYL-3-BUTEN-1-OL
Marvin M. Johnson and Donald G. Kuper, Bartlesville, Okla., assignors to Phillips Petroleum Company
No Drawing. Filed Apr. 24, 1972, Ser. No. 246,587
Int. Cl. C07c 1/24
U.S. Cl. 260—681                                     7 Claims

ABSTRACT OF THE DISCLOSURE

A calcined composition comprising iron, phosphorus, and combined oxygen, and preferably also containing a Group 1A metal, is employed in the dehydration of 3-methyl-3-buten-1-ol to isoprene.

---

This invention relates to a process for dehydration of 3-methyl-3-buten-1-ol to isoprene.

Isoprene is a desirable monomeric material which can be polymerized to provide a broad range of useful elastomers. These elastomers can, in turn, be converted to a large variety of useful rubber goods.

A presently economically attractive route for isoprene involves a two-step process. In the first step, isobutene is reacted with formaldehyde in a Prins reaction under conditions suitable for producing the unsaturated primary alcohol, 3-methyl-3-buten-1-ol. This branched, unsaturated primary alcohol is then dehydrated to isoprene by contact with a catalyst such as calcium phosphate.

The present invention provides an alternative dehydration catalyst and process which has been found particularly suitable for the conversion of 3-methyl-3-buten-1-ol to isoprene. It has been found that this dehydration reaction can be carried out with high conversion and high selectivity by contacting the unsaturated alcohol, under reaction conditions, with a solid calcined catalyst containing iron, phosphorus, and combined oxygen. Optionally, but preferably, the catalyst also contains a minor amount of a Group IA metal.

Accordingly, it is an object of the invention to provide a new process for the dehydration of 3-methyl-3-buten-1-ol to isoprene. Another object of the invention is to achieve high conversion of 3-methyl-3-buten-1-ol in a dehydration process with high selectivity for isoprene. Other objects, aspects and advantages of the invention will be apparent from a study of the specification and the appended claims to the invention.

The catalyst of the present invention is a calcined mixture containing the elements iron, phosphorus and combined oxygen, and the presently preferred catalyst can be represented by the expression Group IA metal/Fe/P/O. The elements contained in the catalysts are not necessarily in the elemental state but can be combined with sufficient oxygen to form one or more neutral compounds such as iron phosphate, iron oxide, lithium oxide, sodium phosphate, potassium oxide, phosphorus oxide, rubidium phosphate, cesium oxide, and the like, and mixtures thereof.

The calcined catalytic compositions of the present invention can be prepared by any suitable method. Conventional methods such as coprecipitation, impregnation, wet-mixing, or dry-mixing can be used. In general, any method can be used which will provide a calcined composition containing an intimate mixture of the above-described elements in the desired proportions, and preferably having a catalytic surface area of at least one square meter per gram. Thus, for example, an iron compound, a phosphorus compound, and a Group IA metal compound can be combined in any suitable way.

Sufficient Group IA metal, iron, and phosphorus compounds will be combined to provide proportions, after calcination, within the ranges shown in the following table:

TABLE

| Element | Wt. percent Broad | Wt. percent Preferred |
|---|---|---|
| Phosphorus | 10–40 | 15–30 |
| Iron | 15–55 | 20–50 |
| Group IA metal | 0–10 | 0.1–5 |
| Combined oxygen | 30–55 | (¹) |

¹ Remainder.

The Group IA metals include lithium, sodium, potassium, rubidium, and cesium. Of these lithium is presently preferred.

Substantially any iron, phosphorus, or Group IA metal compound can be employed in the preparation of these catalysts so long as none of the compounds are detrimental to the final calcined catalyst and so long as essentially all of the elements in the compounds used, other than iron, phosphorus, Group IA metal, or oxygen, are removed from the final catalyst by prior washing or by volatilization such as during calcination. Generally, the preferred iron, phosphorus, and Group IA metal compounds are either the oxides of these elements or compounds which are convertible to the oxide or phosphate on calcination. Some examples of these are ferric oxide, ferrous phosphate, phosphoric acid, ammonium phosphate, lithium nitrate, potassium carbonate, and the like, and mixtures thereof.

In one catalyst preparation method, a Fe/P/O composition can be prepared by treating an iron oxide, iron hydroxide, iron phosphate, or other iron salt with a suitable quantity of phosphoric acid. Alternatively, iron oxides or iron salts can be dry-mixed with phosphorus pentoxide or the like. Similarly, iron phosphates can be precipitated under conditions such that the precipitate contains the desired proportions of iron and phosphorus.

The resulting Fe/P/O composition, before or after calcination, can then be conventionally impregnated with suitable solutions, either aqueous or nonaqueous, of Group IA metal compounds which are convertible to the oxide on calcination. For example, a Fe/P/O composite can be impregnated with aqueous solutions of lithium nitrate. Following the impregnation, the impregnation composite is conventionally dried and calcined in air.

Another catalyst preparation method is to boil a solution containing soluble compounds of iron, phosphorus, and a Group IA metal until sufficient water has been removed and the mixture is a viscous, a syrupy liquid which would solidify on cooling. The largely dehydrated mixture is then relatively rapidly brought to a high temperature in a furnace.

The catalyst of this invention can be used in the form of granules, mechanically compressed pellets, or any other conventional catalyst form. These catalysts can also be employed with suitable supporting or diluting materials such as silica, alumina, magnesia, titania, zirconia, as well as with other similar catalyst support materials known in the art.

Regardless of the specific sequence of steps utilizing the catalyst preparation, the last stage of the preparation is the activation by calcination in an oxygen-containing gas such as air, or air and steam, at a temperature in the range of from about 500 to about 1000° C., for about 0.1 to about 24 hours or until the catalyst is active.

The process of the present invention is ordinarily carried out by passing the 3-methyl-3-buten-1-ol into contact with the catalyst under suitable reaction conditions. Any suitable mode of contact using any suitable type of reactor can be used. Continuous operation using a fixed catalyst bed reactor is the mode presently preferred.

In the reaction zone, the temperature can be in the range of 200–400° C., preferably 300–350° C. The pressure is not believed to be particularly critical but pressures as low as conveniently practical are presently preferred. Ordinarily, pressures less than about 500 p.s.i.g. will be employed. The feed rate will generally be in the range of about 1 to about 10 WHSV (weight of feed per weight of catalyst per hour).

After leaving the reaction zone, the reaction mixture can be subjected to conventional separation means, such as fractionation, to isolate and recover the isoprene product. Unconverted unsaturated alcohol can be recycled to the reaction zone. Similarly, any formaldehyde and isobutene byproducts can be recycled to another catalytic reaction zone which can reconvert these two materials to the 3-methyl-3-buten-1-ol.

The following example is presented in further illustration of the invention, but should not be unduly construed in limitation thereof:

EXAMPLE

A Li/Fe/P/O catalyst was prepared by precipitation of an aqueous solution containing 796 grams of $FeSl_2 \cdot 4H_2O$ and 920 grams of $NH_4H_2PO_4$ by the addition of 320 milliliters of $NH_4OH$ (33% $NH_3$). The precipitate was settled, decanted, washed, filtered, and the filter cake was impregnated with 95.2 grams of $LiNO_3$ dissolved in water. It was then also impregnated with 240 milliliters of $H_3PO_4$ (85%). The mixture was then dried, calcined 16 hours at 1100° F. (593° C.), and ground to a 20–28 mesh size. The catalyst, on analysis, was found to contain 27 weight percent phosphorus, 24 weight percent iron, and 1.4 weight percent lithium.

In addition, a Fe/P/O catalyst was prepared. It was prepared using the identical procedure described above except that the addition of the $LiNO_3$ was omitted.

For purposes of comparison, a Li/P/O catalyst was also prepared. This catalyst consisted of finely divided granules of lithium phosphate.

Each of the catalysts described above was tested for effectiveness in the dehydration of 3-methyl-3-buten-1-ol to isoprene. A 5.8 gram quantity of the Li/Fe/P/O catalyst was charged into a vertical stainless steel fixed bed reactor having a diameter of about ½-inch. The reactor contained a quantity of glass beads on either side of the catalyst bed, the glass beads preceding the catalyst bed acting as preheat zone to insure vaporization of the feed.

The unsaturated alcohol was passed through the reaction zone at 5 WHSV and at atmospheric pressure. The reactor was maintained at 300° C. The reactor effluent was collected in a reservoir maintained at about −50° C. After 15 minutes on stream, the collected effluent was sampled and analyzed by gas-liquid chromatography.

In a similar fashion, the other catalysts described above were also tested. The results of these tests are shown in the table below:

TABLE

| Catalyst | Temperature, °C. | WHSV | Percent Conversion | Selectivity to isoprene |
|---|---|---|---|---|
| Fe/P/O | 300 | 5 | 24 | 58 |
| Li/Fe/P/O | 300 | 5 | 88 | 86 |
| Li/P/O | 300 | 2 | <10 | <50 |

The data in the table above show that the Fe/P/O catalyst is active and effective for the dehydration of 3-methyl-3-buten-1-ol to isoprene. It is also seen that incorporating a minor quantity of lithium into that catalyst greatly improves both the conversion and selectivity to isoprene. A Li/P/O catalyst, which contains no iron, is significantly inferior indicating that the total combination of iron, lithium, and phosphorus is required for best results.

Reasonable variations and modifications are possible within the scope of the foregoing disclosure and the appended claims to the invention.

We claim:

1. A process which comprises contacting 3-methyl-3-buten-1-ol under suitable reaction conditions with a catalyst comprising a calcined composition of iron, phosphorus, a Group I–A metal and combined oxygen to produce isoprene, the iron constituting from about 15 to about 55 weight percent of said composition, the phosphorus constituting from about 10 to about 40 weight percent of said composition, the Group I–A metal constituting from about 0.1 to about 10 weight percent of said composition, and the oxygen constituting from about 30 to about 55 weight percent of said composition.

2. A process in accordance with claim 1 wherein the iron constitutes from about 20 to about 50 weight percent of said composition, the phosphorus constitutes from about 15 to about 30 weight percent of said composition, the Group I–A metal constitutes from about 0.1 to about 5 weight percent of said composition, and the oxygen constitutes from about 30 to about 55 weight percent of said composition.

3. A process in accordance with claim 2 wherein the Group I–A metal is lithium.

4. A process in accordance with claim 1 wherein said reaction conditions comprise a temperature in the range of about 200 to about 400° C. and a feed rate in weight of feed per weight of catalyst per hour in the range of about 1 to about 10.

5. A process in accordance with claim 4 further comprising recovering isoprene from the resulting reaction effluent.

6. A process in accordance with claim 5 wherein the iron constitutes from about 20 to about 50 weight percent of said composition, the phosphorus constitutes from about 15 to about 30 weight percent of said composition, the Group I–A metal constitutes from about 0.1 to about 5 weight percent of said composition, and the oxygen constitutes from about 30 to about 55 weight percent of said composition.

7. A process in accordance with claim 6 wherein said Group I–A metal is lithium.

References Cited

UNITED STATES PATENTS

| 3,657,376 | 4/1972 | Stuebinger et al. | 260—681 |
| 2,204,157 | 6/1940 | Semon | 260—681 |
| 3,665,047 | 5/1972 | Gislon et al. | 260—681 |
| 3,253,051 | 5/1966 | Yanagita et al. | 260—681 |
| 3,714,285 | 1/1973 | Mueller et al. | 260—681 |

OTHER REFERENCES

Ladoo et al., Nonmetallic Minerals, p. 408, McGraw-Hill Book Company, Inc., 2nd ed., 1951.

DELBERT E. GANTZ, Primary Examiner

C. E. SPRESSER, Jr., Assistant Examiner